United States Patent Office 2,836,540
Patented May 27, 1958

2,836,540

PHARMACEUTICAL ANTACID COMPOSITION

Leo L. Hardt, Chicago, Ill., assignor to The Hardt Foundation, a corporation not for profit of Illinois No Drawing. Application March 19, 1952
Serial No. 277,535

1 Claim. (Cl. 167—55)

My present invention relates to a pharmaceutical composition and especially to a composition which is particularly adapted for the treatment of peptic ulcer.

Many antacid preparations have been used for the treatment of peptic ulcer, both of the duodenal and gastric type, and for hyperacidity and hypertrophic gastritis.

Most antacid compositions which are widely used and which have many advantages as acid suppressants are formulated from the salts of metals, such as calcium carbonate, magnesium carbonate and aluminum hydroxide. Although many of these materials possess adsorptive properties and tend to neutralize gastric acids, gastroscopic studies have shown that they do not coat or adhere to the lining of the stomach, which coating action is greatly advantageous and highly desirable for protecting ulcerative lesions from the corrosive action of the acids of the gastric juices.

Furthermore, while the introduction of antiacid materials into the stomach tends to neutralize the free acid in the stomach, this condition is ordinarily followed by a rapid acid rebound in which the acid reaction of the stomach increases sharply and, in many instances, exceeds the normal acid concentration found in the stomach before ingestion of the antacid.

One purpose of my invention is to provide an antacid composition which neutralizes the acid condition of the stomach for a prolonged period of time.

A further purpose of my invention is to provide an antacid composition which attenuates the rapid acid rebound curve which ordinarily follows the administration of most antacids.

Still another purpose of my invention is to provide an antacid which is highly adsorbent and which uniformly coats the lining of the stomach.

A still further object of my invention is to provide an antacid of the above described characteristics which is relatively cheap to manufacture.

In accordance with my invention, I have discovered that by mixing an alkaline alginate, preferably sodium alginate, and a vegetable protein such as a material of comparatively high protein, low carbohydrate content obtained by grinding oat grains and separating the coarser protein from the carbohydrate, there is obtained a combination which according to clinical and gastroscopic tests forms an antacid composition which because of its adsorbent qualities, its ability to neutralize gastric acids and its tendency to coat the lining of the stomach approaches an ideal antacid for the treatment of hyperacidity, gastritis and peptic ulcer.

Although it is preferred to use the high protein, low carbohydrate fraction present in ground oat grains, other vegetable proteins such as wheat protein may be used to partially or completely replace the oat protein.

This composition, as set forth above, has the important advantage over aluminum hydroxide gel compositions hitherto used in that it provides an effective medium for coating of the gastric mucosa and the ulcer. Adsorption and neutralization of the acids of the gastric juice remain at a high level and are not followed by a marked acid rebound as in the case of other antacids.

Other antacid materials may be added to my sodium alginate oat protein composition. One material which has been found particularly efficacious is aluminum hydroxide. Magnesium trisilicate, which has a tendency to form a certain amount of bulk, may also be added. Other antacid materials may be used with, or in place of, aluminum hydroxide and magnesium trisilicate such as calcium carbonate, tribasic calcium phosphate and magnesium carbonate.

The composition may be made in liquid or dry form and in addition to the active ingredients of the composition I may use various inert solids, particularly when the composition is made in dry form.

The proportions of the various ingredients in my composition may be varied widely. The addition of alkaline alginate to the vegetable protein makes the composition suitable for coating the lining of the stomach and may suitably be present in 10% to about 90% of the weight of the vegetable protein, although the amount of the alginate may be lower than 10%, with correspondingly less coating efficiency, and higher than 90%, with, however, a corresponding increase in stickiness of the composition, which stickiness is generally found objectionable. Highly satisfactory results have been obtained from a mixture comprising approximately equal proportions of an alkaline alginate and a vegetable protein.

In addition to the alginate and vegetable protein, there is preferably added an antacid such as aluminum hydroxide, magnesium carbonate, calcium carbonate, and the like, with or without magnesium trisilicate, excipients and lubricants. Aluminum hydroxide may be used in relatively high proportions without deleteriously affecting the alginate-protein combination, and may suitably be used as high as 98% of the combination. Preferably it is used from about 5% to 80% by weight of the composition with magnesium trisilicate present from 5% to 60% by weight.

Other antacids such as calcium carbonate and magnesium carbonate may also be used in the composition. Inert materials such as excipients, lubricants and binders may vary from 0% to 85% by weight, but preferably from 0% to 60% by weight.

My composition is preferably used in the form of tablets prepared by mixing the active ingredients (alkaline alginate, a vegetable protein of comparatively high protein, low carbohydrate content, aluminum hydroxide and magnesium trisilicate) with excipients such as sugar, talc, cornstarch and other binders, lubricants (calcium stearate) and flavoring oils (oil of peppermint, oil of fennel and methyl salicylate). A tablet made by dry granulation process which has been found to be particularly suitable has the following composition:

*Per tablet*

|  | Grains | Percentage By Weight |
|---|---|---|
| Sodium alginate | 1.5 | 8.83 |
| High protein oat material | 2.0 | 11.76 |
| Aluminum hydroxide | 3.0 | 17.65 |
| Magnesium trisilicate | 5.0 | 29.41 |
| Calcium carbonate | 3.5 | 20.59 |
| Magnesium carbonate | 2.0 | 11.76 |

While there have been shown and described certain embodiments of my invention, it is to be understood that it is capable of many modifications; for example, other alkaline alginates such as potassium and ammonium alginate may be used to partially or completely replace the sodium alginate. Changes, therefore, may be made without departing from the spirit and scope of the invention as described in the appended claim in which it is the intention to claim all novelty inherent in the invention as broadly as possible in view of the prior art.

I claim:

A pharmaceutical composition comprising a mixture of an alkali metal alginate, alkaline earth carbonate, aluminum hydroxide, magnesium trisilicate, and that fraction of oats consisting essentially of all the proteins of the oat grain, the alkali metal alginate being present in from 10% to 90% of the weight of the oat grain protein.

References Cited in the file of this patent

UNITED STATES PATENTS

| | | |
|---|---|---|
| 2,355,030 | Musher | Aug. 1, 1944 |
| 2,395,061 | Musher | Feb. 19, 1946 |
| 2,430,180 | Le Gloahec | Nov. 4, 1947 |
| 2,638,433 | George | May 12, 1953 |

OTHER REFERENCES

Gutman: Mod. Drug. Enxyxl., 3rd ed. (1946), p. 769.

Osborn: J. of Am. Pharm. Asso., Prac. Pharm. Ed., October 1941, pp. 420–423.

U. S. Dispensatory, 24th ed. (1947), pp. 1055, 1534, 1535.

Ludwig: Proc. Soc. Exptl. Biol. Med., January 1952, pp. 176–179.

Hall et al.: J. Am. Diatetic Asso., vol. 25, 1949, pp. 1022 and 1023.